United States Patent [19]

Alexander

[11] Patent Number: 4,706,471

[45] Date of Patent: Nov. 17, 1987

[54] SOLAR CHIMNEY

[76] Inventor: Louis E. Alexander, 1881 2nd Ave., Sutter, Calif. 95982

[21] Appl. No.: 712,240

[22] Filed: Mar. 15, 1985

[51] Int. Cl.[4] ............................................. F25B 27/00
[52] U.S. Cl. .................................... 62/235.1; 62/260; 98/900
[58] Field of Search ............... 62/235.1, 260; 126/428, 126/429, 437, 438, 439; 98/900

[56] References Cited

U.S. PATENT DOCUMENTS

| | | | |
|---|---|---|---|
| 4,006,856 | 2/1977 | Nilsson | 126/428 |
| 4,295,415 | 10/1981 | Schneider, Jr. | 126/428 |
| 4,404,959 | 9/1983 | Mondragon | 126/429 |

Primary Examiner—Henry Bennett

[57] ABSTRACT

A device designed for utilization in a solar driven air conditioning system. The device is designed to maximize air flow through a conditioning medium, such as the earth or a large capacity heat sink, by introducing heat from a solar collector into a vertical solar chimney utilizing the thermosiphoning effect of warm liquid, thereby causing increased air flow up through the chimney because of the well known effect of rising hot air.

11 Claims, 8 Drawing Figures

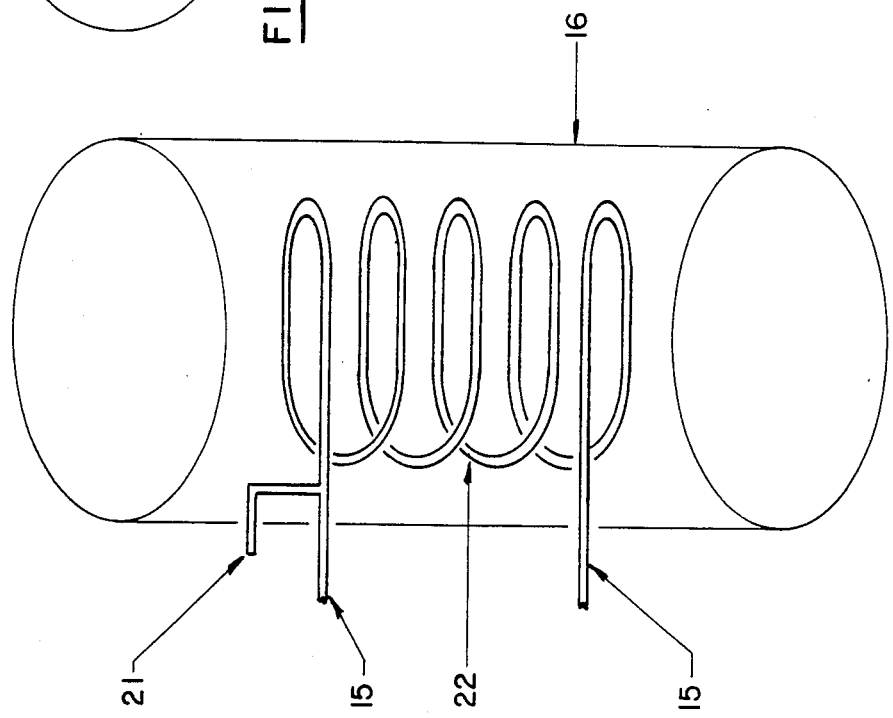
FIGURE 7
FIGURE 5
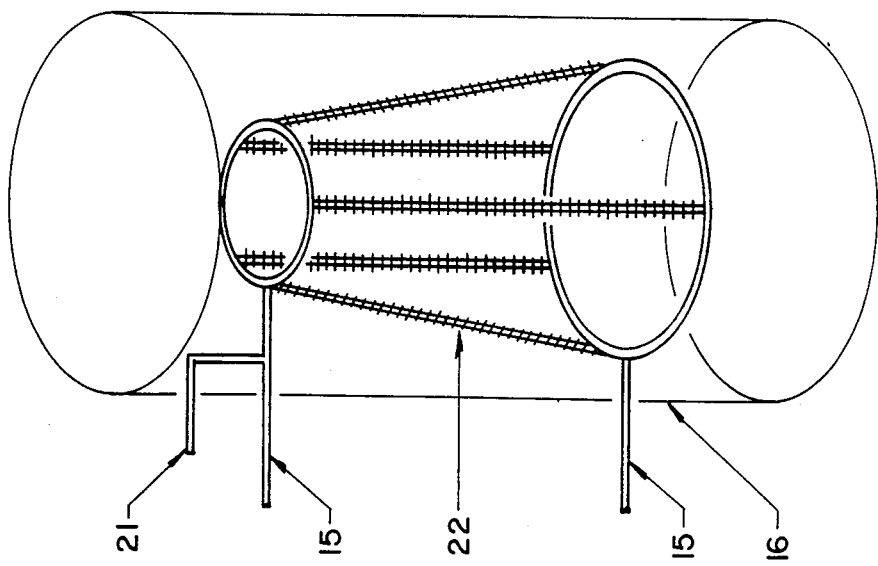
FIGURE 4

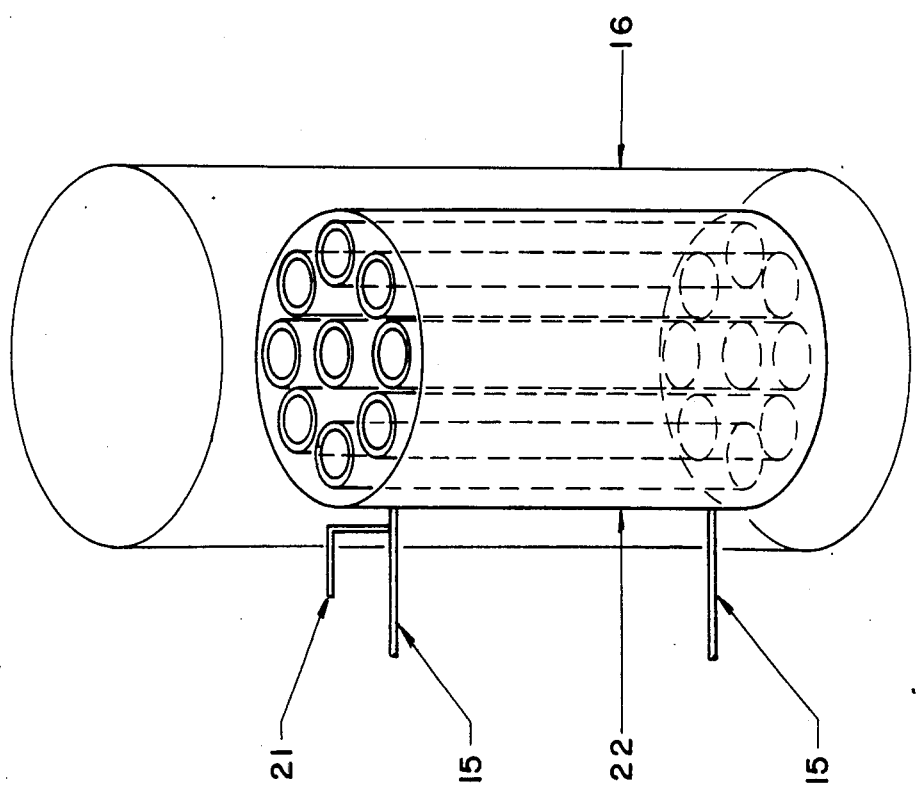

SOLAR CHIMNEY

BACKGROUND OF THE INVENTION

1. Field of Invention

The present invention relates generally to air conditioning cooling systems and more particularly, but not by way of limitation, relates to an improved cooling system utilizing solar energy as the driving force, and a buried thermal system to accomplish the conditioning cooling of the moving air which is then introduced into a body, structure, or building or the like.

2. Description of Prior Art

Air conditioning cooling has become a fact of life and a large part of the hot weather use of electrical energy is used to drive such air conditioning. Virtually all systems to date use either the conventional evaporation/condensation (freon) cycle or if using solar energy the ammonia/brine cycle. These are similar cycles in that they both use evaporation and condensation to peform the cooling; the difference being that the ammonia/brine cycle starts from a much higher thermal plane. Both use large amounts of electical energy to perform these cycles and to pump the hot liquid from the condenser portion to and through the evaporation coils. Here large air movers (fans) move air across the cooling (evaporation) coils and into the structure, etc., that is to be cooled. Large fans are also necessary at the condensation coils to remove heat of condensation by moving air across the condensation coils. By far the largest amount of energy is used to perform the actual condensation of the gas back to a liquid during the cycle. In many parts of the country brownouts or blackouts occur frequently depending on the outside temperature and increased use of power (electrical) for air conditioning systems during the hottest parts of the summer.

SUMMARY OF INVENTION

The present invention in its broadest aspect contemplates a cooling system utilizing solar energy as the driving force for transferring heat from the air to the earth and thence drawing the cooled air from the transfer system buried in the earth into and through a body of material, structure, or building providing cooling for same and then exhausting the warmed air from the body of material, structure, or building through the solar chimney. It is a primary objective to provide a cooling system utilizing the most simple of apparatus and operating at the lowest possible expenditure of electrical energy or at no energy input except that of the solar collector. It is a further objective to provide a system that is simple and easy to install, has few or no moving parts, and thereby provides an extremely long life with little or no maintenance over the life of the system. It is a further objective to provide a system of cooling that operates at minimum cost over wide variations of outside temperature and becomes more efficient as outside temperature rises. It is a further objective to use available solar energy from a simple flat plate solar collector or from the more advanced tracking collectors. A further advantage is that the higher the outside temperature and the more delivered to the solar chimney by the collector the more efficient the cooling system becomes.

BRIEF DESCRIPTION OF THE INVENTION

The novel features of the invention are set forth with particularity in the appended claims. The invention, both to its organization and its methods of operation, together with additional objectives and advantages thereof will best be understood from the following description of specific components where read in connection with the accompanying drawings wherein reference characters indicate like parts throughout the several figures and in which:

FIG. 4 is a perspective view of one aspect of the construction of the heat input device in the solar chimney.

FIG. 5 is a perspective view of a different aspect of the construction of the heat input device in the solar chimney.

FIG. 6 is a perspective view of a different aspect of the construction of the heat input device in the solar chimney.

FIG. 7 is a detailed view of tubing in the heat input device showing the use of finned tubing that can be utilized to enhance heat transfer.

DESCRIPTION OF THE PREFERRED EMBODIMENT

Figure 1:
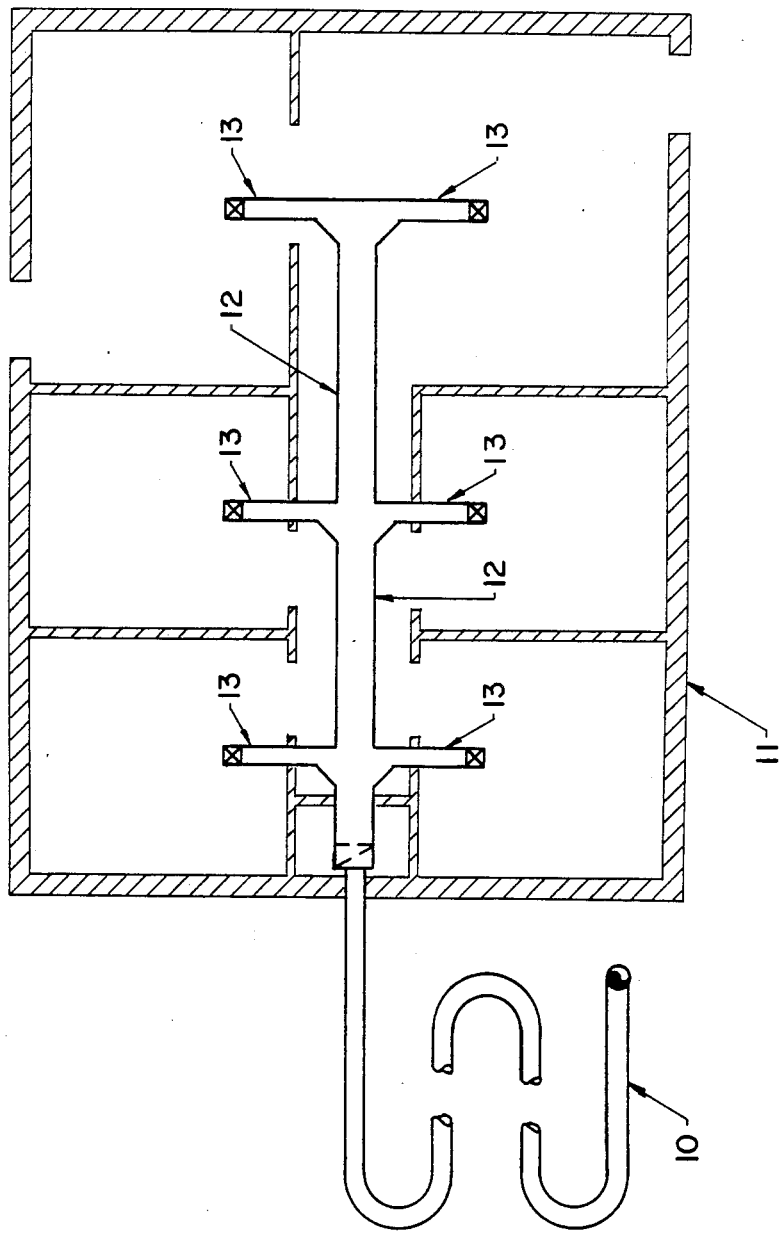
FIG. 1 is a plan view showing the cooling system according to the invention which utilizes the earth as a heat sink, with a variable length of plastic pipe of appropriate diameter buried therein, together with a plenum shown installed beneath the floor of a typical swelling with outlets in each room that is desired to be cooled.
Figure 3:
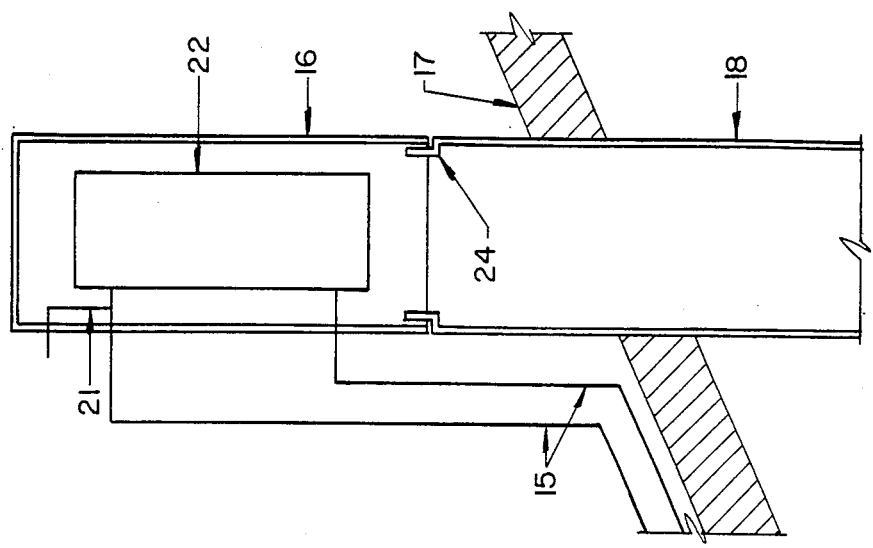
FIG. 3 is a side view elevation showing the through the roof duct work of the exhaust side of the invention; and the side vies of the solar chimney with the connecting lines from the solar collector.
Figure 2:
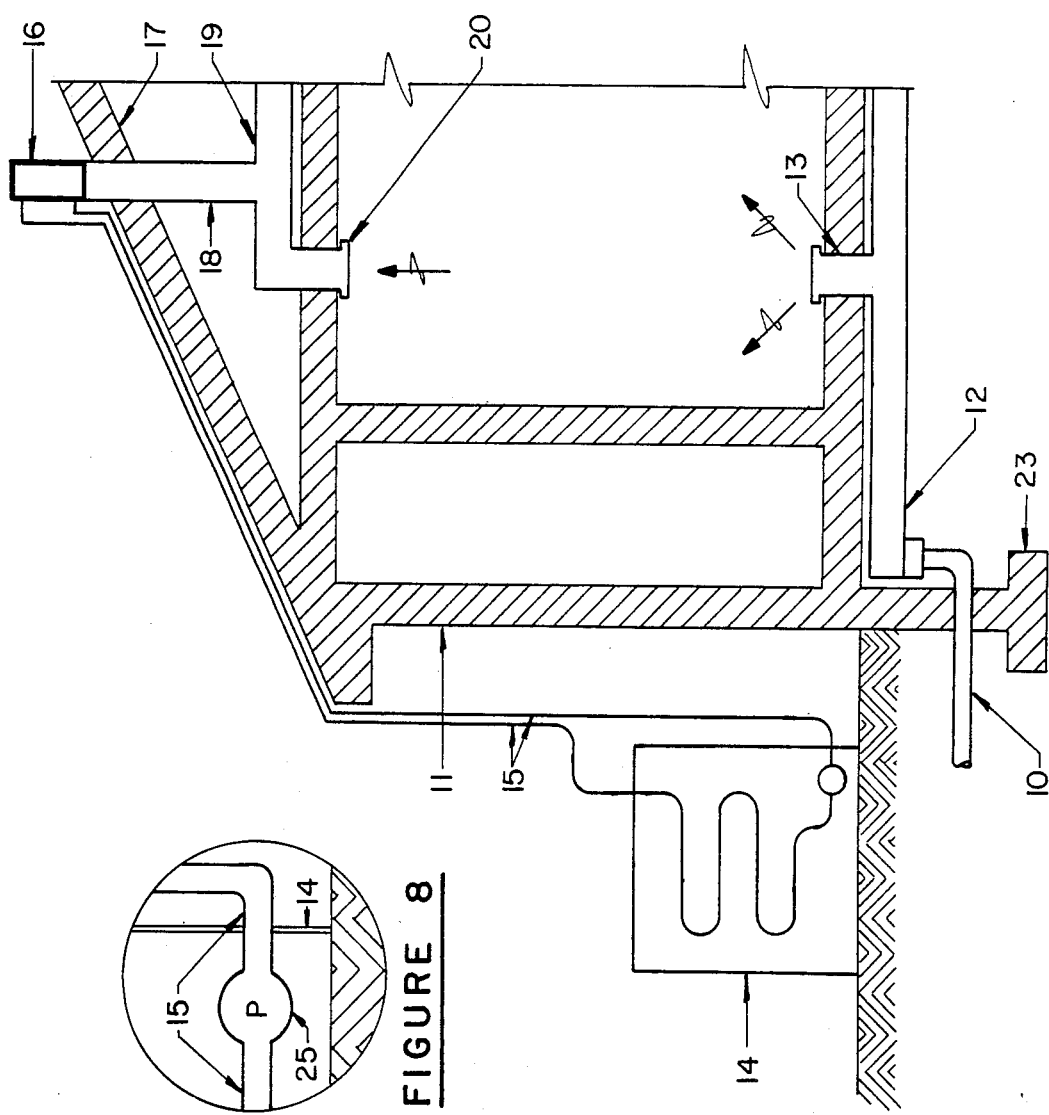
FIG. 2 is an elevation view showing the installation of the plenum and outlets typical in each room, and showing the duct work of the exhaust side of the invention, together with the solar chimney through the roof installation; the solar panel and connecting lines to the solar chimney.

The invention relates to an air conditioning system that incorporates numerous devices in an overall system which will perform cooling in a structure, building, or body of material at virtually no cost once the system is installed, and with a very long maintenance free life. FIG. 1 shows one embodiment of the cooling pipe 10 which is buried in the earth and is as long as necessary to achieve the proper heat transfer, said pipe 10 is connected to the interior of a structure 11 through a plenum 12 which has branches 13 opening into each room desired to be cooled PIPE 10 is buried deeply enough (4–7 feet) so that the constant temperature of the earth (54–59 degrees) can be utilized to cool the air flow through pipe 10. The length and diameter of pipe 10 is calculated so that proper heat transfer is accomplished at a predetermined air flow (cfm) to provide minimum cooling for the structure 11. Structure 11 is shown in FIG. 1 as a typical 6 room dwelling but this is for illustration only and in no way is intended to limit in any way the application of the invention to any type building or structure and any other application. FIG. 2 shows one arrangement of the invention detailing the entrance of pipe 10 and the connection of plenum 12. In this view the pipe 10 is shown entering the structure 11 through foundation 23. This view is in no way intended to limit the mechanical connection from pipe 10 to plenum k12. In FIG. 2 is shown one of the possible arrangements for placing the solar collector 14 and connecting same to the solar chimney 16 with pipes 15. Exhaust plenum 19 is connected to solar chimney 16 by exhaust plenum connector 18. Exhaust plenum 19 is also a branched plenum having branches 20 in each room which is to be cooled. FIG. 3 shows how the solar chimney 16 is connected to the exhaust plenum 18 and how the exhaust plenum connector 18 passes through the roof 17 of the structure 11. This is in no way intended to limit the methods of connecting the exhaust plenum 19 to the solar chimney 16 to through the roof 17 only. All other methods of connecting said parts together are contemplated and incorporated within the idea. The exhaust plenum connection 18 is constructed so that the solar chimney 16 fits down over the lip 24 creating a water proof connection. This is conventional methods of joining pipes for stoves or exhaust systems. The solar chimney 16 is constructed of an external sheet metal tube of appropriate diameter together with the interior heat input device 22 mounted inside the sheet metal tube. FIG. 4, 5, and 6, are but three aspects of the various configurations in which the heat input device 22 can be configured. These in no way limit and are intended in no ways to limit the configurations of the heat input device 22 but are for illustration only. FIG. 7 is an expanded view of one aspect of a finned tube coiled as shown in FIG. 5. Various methods of increasing heat transfer are contemplated which include but are not limited to creating heat transfer device 22. In all cases where an open system is used the thermosiphoning effect is dependent on having the system completely full of the working fluid used to transfer the heat from the solar collector 14 to the heat transfer device 22. In order to assure this condition and to facilitate determination of the condition, overflow tube 21 is attached at the external or upper end of the solar chimney 16 to the highest point of the system. This overflow tube 21 extends up and above the input to the heat input device 22 and becomes the highest point in the system, and it is then a simple matter to fill the system with fluid, such as water, until the liquid is seen to flow out of overflow tube 21. This assures that the system is full and that the thermosiphoning effect will take place.

Figure 8:
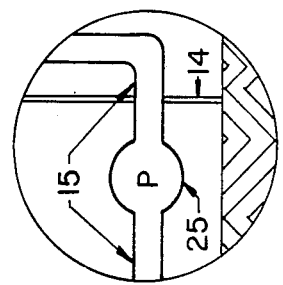
FIG. 8 is a view of an optional pump that can be added to the system.

Also contemplated in this sytem is a plan to assure circulation through the solar collector 14 and through the heat input device 22 a small pump 25 as shown in FIG. 8. This pump 25 would be of the small, less than ¼ horse power, type used to circulate water through outdoor fountains.

Although certain specific embodiments or configurations of the invention have been shown and described it is apparent to one skilled in the art that other modification to the systems are possible. The invention therefore is not intended to be restrictive in any way to the exact showing of the drawing and description thereof, but is considered to include reasonable and obvious modifications, equivalents and changes.

What is claimed is:
1. A heat input device system comprising:
 (a) a heat input device constructed of tubing, comprising a circular top ring joined by vertical tubes to a circular bottom ring, and having an inlet port at the top ring and an outlet port at the bottom ring;
 (b) a means of collecting and transfering heat to a fluid medium;
 (c) a means of transferring said heated fluid to the heat input device from the means of collecting said heat, and to the inlet port which is at the highest point of said heat input device;
 (d) a means of transferring said fluid from the lowest port of the heat input device back to the means of collecting said heat;
 (e) duct means buried in a cooling medium, generally the earth, of large capacity which is used to cool incoming air;
 (f) duct means of distributing said cooled air through the structure to be cooled;
 (g) duct means installed at ceiling level and above used to exhaust warm or hot air from the structure to be cooled;
 (h) exhaust outlet wherein the heat input device is added to input heat to the natural outflow of the exhaust thereby increasing the exhaust outflow and thereby increasing the inflow through the cooling medium and thence through the structure being cooled.

2. A heat input device according to claim 1 constructed of tubing having radiation fins attached thereto to enhance heat transfer.

3. A heat input device according to claim 1 constructed of tubing coiled in a circular fashion forming a continuous coil of tubing from top to bottom with spacing between each coil not more than 1 inch, with an inlet connection at the top of the coil and an outlet connection at the bottom.

4. A heat input device according to claim 3 constructed of tubing having radiation fins attached thereto to enhance heat transfer.

5. A heat input device according to claim 1 constructed of a circular container having a top and bottom welded to said circular sides, and having open tubes welded between holes placed in said top a and bottom sections, said tubes forming air passages through the heat input device circular container, and having an inlet port at the top of said device and an outlet port at the bottom.

6. A heat input device system according to claim 1, containing a pump means for cirulating said fluid from the heat collecting device to and through the said heat input device and thence back to the said heat collecting device.

7. A heat input device system according to claim 1, wherein said means for collecting and transferring heat is a solar radiation collector.

8. A heat input device system according to claim 1, comprising a plurality of solar radiation collectors.

9. A heat input device system according to claim 1 comprising a plurality of buried thermal units.

10. A heat input device system according to claim 1 wherein the solar radiation collectors are generally flat plates, angled to the earth and having a inlet port for fluid at the bottom end and an outlet port at the higher end.

11. A heat input device system according to claim 1 wherein the solar radiation collectors are generally curved to focus the intensity of the solar radiation and with a means of automatically moving its whole panel so as to tract the sun and maintain the most efficient angle to capture the solar radiation.

* * * * *